J. C. MOORE.
CHAMBER VESSEL.

No. 186,264. Patented Jan. 16, 1877.

WITNESSES
Thomas Bernard
F. J. Chasi

INVENTOR
James C. Moore,
by E. W. Anderson,
ATTORNEY.

UNITED STATES PATENT OFFICE.

JAMES C. MOORE, OF PHILADELPHIA, PENNSYLVANIA.

IMPROVEMENT IN CHAMBER-VESSELS.

Specification forming part of Letters Patent No. 186,264, dated January 16, 1877; application filed May 20, 1876.

*To all whom it may concern:*

Be it known that I, JAMES C. MOORE, of Philadelphia, in the county of Philadelphia and State of Pennsylvania, have invented a new and valuable Improvement in Chamber-Vessels; and I do hereby declare that the following is a full, clear, and exact description of the construction and operation of the same, reference being had to the annexed drawings, making a part of this specification, and to the letters and figures of reference marked thereon.

Figure 1:
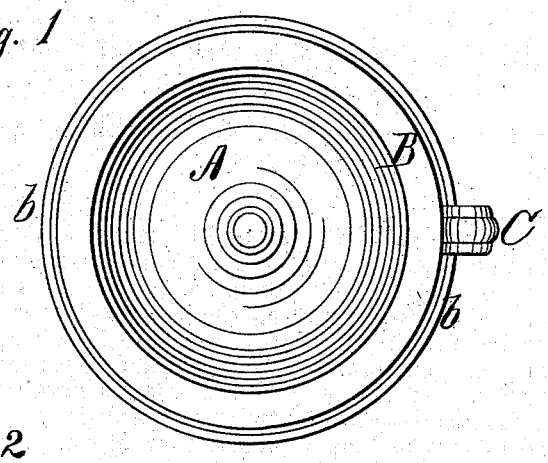
Figure 2:
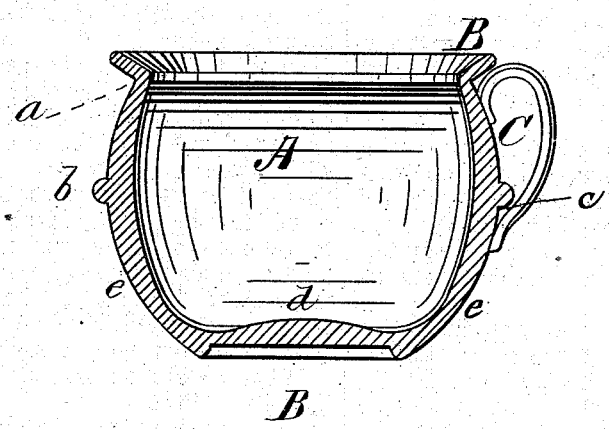
Figure 3:
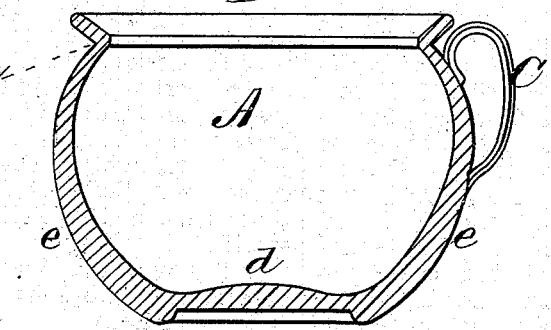

Figure 1 of the drawings is a representation of a plan view of my improved utensil, and Figs. 2 and 3 are vertical transverse sections of the same.

This invention has relation to vessels for chamber use; and it consists in the construction and novel arrangement of the parts of the pot in such a manner that when overset it will right itself quickly, and avoid spilling the contents, as hereinafter more fully shown and described.

In the accompanying drawings, the letter A designates the body of the vessel, and B its rim, attached to the body at the mouth, or molded therewith when the vessel is made of earthenware. This rim may be made a little concave from the external margin inward. The body A expands outward in its upper portion from the neck $a$ to the center or equator of the bulge, which may be provided with an external rib, $b$, if the bulge is not otherwise of larger diameter than the rim. From the largest portion or equator $c$ of the bulge the body of the pot is gradually reduced—preferably in spherical form—until the base $d$ is reached. This base or flat portion, upon which the utensil stands, is generally of sufficient size, and yet somewhat smaller than the mouth of the pot. The weight of the material of which the vessel is formed is, by this construction, thrown below the equator $c$ of the vessel. C represents the handle, which is attached usually at its upper end to the rim, and at its lower end to the body of the pot, at about its largest diameter. This handle and the rim serve as stops to prevent the vessel from turning completely over on its mouth, and to prevent it from rolling.

Within the chamber its cavity extends laterally outward from the inner edge of the mouth, forming an annular recess, into which, when the chamber-pot is turned upon its side, the contents will be received. This recess is, by the construction of a deep rim and bulge, designed to be made as capacious as possible, although generally the vessel, when overset, rights itself so quickly that there is no danger of the spilling of the contents. The rounded or spherical portion $e$ of the vessel below the equator allows it to rock thereon, so that a sudden overset will rarely occur. The external margin of the rim is not necessarily made smaller than the diameter of the pot at the bulge. It may be of the same size, or larger, but should be of sufficient size to stop the vessel from being completely overset.

What I claim as new, and desire to secure by Letters Patent, is—

1. A self-righting chamber-pot, having a deep rim, B, and a body, A, bulged outward from the neck $a$, where it joins the rim, to the central portion $c$, where it is of largest diameter, and then reduced in spherical form to the base, substantially as specified.

2. A self-righting chamber-pot, consisting of the rim B, body A bulging outward under the same, and the handle C, substantially as specified.

In testimony that I claim the above I have hereunto subscribed my name in the presence of two witnesses.

JAMES C. MOORE.

Witnesses:
ALLEN H. GANGEWER,
GEO. C. SHELMERDINE.